United States Patent
Sakamoto

(10) Patent No.: US 7,382,403 B2
(45) Date of Patent: Jun. 3, 2008

(54) APPARATUS AND METHOD FOR SYNTHESIZING IMAGE SIGNALS INTO A WIDE DYNAMIC RANGE IMAGE THAT HAS BEEN PROCESSED WITH SATURATION CORRECTION

(75) Inventor: Koichi Sakamoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 956 days.

(21) Appl. No.: 10/740,848

(22) Filed: Dec. 22, 2003

(65) Prior Publication Data

US 2004/0130638 A1  Jul. 8, 2004

(30) Foreign Application Priority Data

Dec. 25, 2002 (JP) ............... 2002-374450

(51) Int. Cl.
*H04N 5/235* (2006.01)
*H04N 9/68* (2006.01)
(52) U.S. Cl. ............... 348/230.1; 348/229.1; 348/235
(58) Field of Classification Search ............ 348/222.1, 348/223.1, 229.1, 230.1, 234–7; 382/274
See application file for complete search history.

(56) References Cited

U.S. PATENT DOCUMENTS

| | | | | |
|---|---|---|---|---|
| 5,264,944 | A | * | 11/1993 | Takemura .............. 386/38 |
| 5,801,773 | A | | 9/1998 | Ikeda |
| 6,204,881 | B1 | | 3/2001 | Ikeda et al. |
| 6,965,406 | B1 | * | 11/2005 | Ueda et al. ............. 348/252 |
| 7,202,892 | B1 | * | 4/2007 | Ogata et al. ........... 348/229.1 |
| 2002/0145674 | A1 | * | 10/2002 | Nakamura ............. 348/296 |

(Continued)

FOREIGN PATENT DOCUMENTS

JP    07-131796    *    5/1995

(Continued)

OTHER PUBLICATIONS

English abstract of Japanese Patent Publication 07-131796 published May 19, 1995.*

(Continued)

*Primary Examiner*—Lin Ye
*Assistant Examiner*—Dan Pasiewicz
(74) *Attorney, Agent, or Firm*—Birch, Stewart, Kolasch & Birch, LLP

(57) ABSTRACT

An imaging apparatus is provided with an imaging element for outputting both a color signal of high-power image data and a color signal of low-power image data; gamma correcting means for gamma-correcting the high-power image data and for gamma-correcting the low-power image data; image synthesizing means for adding the high-power image data which has been gamma-corrected by the gamma correcting means to the low-power image data which has been gamma-corrected by the gamma correcting means, and also for multiplying the added image data by a total gain value in response to a scene so as to perform an image synthesizing operation; converting means for converting the synthesized image data synthesized by the image synthesizing means into both a luminance signal and a color difference signal; and saturation correcting means for performing a saturation correcting process operation with respect to the color difference signal in response to the luminance signal obtained by the converting means and a dynamic range of the synthesized image data.

8 Claims, 5 Drawing Sheets

U.S. PATENT DOCUMENTS

2004/0051790 A1* 3/2004 Tamaru et al. ........... 348/223.1

FOREIGN PATENT DOCUMENTS

| JP | 7-131796 | A | 5/1995 |
| JP | 7-131796 | A | 5/1995 |
| JP | 10-136391 | A | 5/1998 |
| JP | 2000-023183 | * | 1/2000 |
| JP | 2000-23183 | A | 1/2000 |
| JP | 2002-366121 | * | 12/2002 |
| JP | 2002-366121 | A | 12/2002 |

OTHER PUBLICATIONS

English abstract of Japanese Patent Publication 2002-366121 published Dec. 20, 2002.*

English abstract of Japanese Patent Publication 2000-023183 published Jun. 29, 1998.*

* cited by examiner

APPARATUS AND METHOD FOR SYNTHESIZING IMAGE SIGNALS INTO A WIDE DYNAMIC RANGE IMAGE THAT HAS BEEN PROCESSED WITH SATURATION CORRECTION

This Nonprovisional application claims priority under 35 U.S.C. § 119(a) on Patent Application No(s). 2002-374450 filed in JAPAN on Dec. 25, 2002, the entire contents of which are hereby incorporated by reference.

BACKGROUND OF THE INVENTION

The present invention is related to an image synthesizing method and an imaging apparatus. More specifically, the present invention is directed to an image synthesizing method and an imaging apparatus, capable of obtaining an image signal whose dynamic range has been widened, while both a white balance and a color balance are properly adjusted.

In the case that, for example, an indoor scene is imaged by such an imaging apparatus as a digital still camera, even if good pictures of photographic objects located in an indoor space can be acquired, the blue sky viewed from a window is skipped from an entire image in a white color, so that this entire image may sometimes become unnatural. This is because a dynamic range of the image is narrow. In order to solve this problem, dynamic ranges of images have been conventionally widened by photographing two sets of images and by synthesizing these two images with each other.

For instance, a first short-exposing-time image (low-sensitivity image) is photographed by actuating a shutter in a high speed, and continuously, a second long-exposing-time image (high-sensitivity image) is photographed by actuating the shutter in a low speed, and then, since these two images are synthesized with each other, a scene outside a window, which has been photographed in the low-sensitivity image, may be overlapped with the high-sensitivity image in which an indoor scene has been photographed under better condition.

When such an image synthesizing operation is carried out, since the red (R) signal of the high-sensitivity image can be hardly saturated, as compared with the green (G) signal and the blue (B) signal, the entire high-sensitivity image mainly owns a cyan color. As a result, since the synthesized image is also influenced by the color signal mainly having the cyan color of the high-sensitivity image, there is a problem that the color balance of the entire synthesized image is no longer maintained.

To solve the color balance problem, in the conventional techniques described in, for example, Japanese Patent Publication No. Hei-7-131796, the color signal of one image to be synthesized is multiplied by "k", and then this k-multiplied image is synthesized with the other image so as to adjust the saturation of the synthesized image.

In the above-explained art, when the color signals of the two photograph images are synthesized with each other, the gray color balance is controlled. However, this conventional technique does not consider shifts contained in white balances of these two images. As a result, the white balance of the high-sensitivity image is different from the white balance of the low-sensitivity image, which are contained in the synthesized image. Thus, there is such a problem that a synthesized image having a sense of incongruity may be formed, depending upon a photographic scene.

Recently, such an imaging apparatus as a digital still camera has been proposed. For instance, while both high-sensitivity pixels and low-sensitivity pixels are mounted on a solid-state imaging element of this digital still camera, a high-sensitivity image (will also be referred to as "high-power image" hereinafter) imaged by the high-sensitivity pixels is synthesized with a low-sensitivity image (will also be referred to as "low-power image" hereinafter) imaged by the low-sensitivity pixels so as to output the synthesized high-sensitive/low-sensitive images as a single image data. When this proposed imaging apparatus performs the image synthesizing operation, executions of not only a color balance, but also a white balance are required.

SUMMARY OF THE INVENTION

An object of the present invention is to provide both an image synthesizing method and an imaging apparatus, capable of synthesizing images having wide dynamic ranges with each other to output a synthesized image, while both a color balance and a white balance are properly adjusted.

To achieve the above-explained object, an image synthesizing method, in which after both a color signal of high-power image data and a color signal of low-power image data are subjected gain-correction and gamma-correction respectively, the gamma-corrected image data are synthesized with each other, and then, color signals of the synthesized image data are converted into a luminance signal and a color difference signal; in which added image data of the high-power image data and the low-power image data is multiplied by a total gain value in response to a scene to set the resultant image data as the synthesized image data; and a saturation correcting operation of the synthesized image data is carried out in response to a dynamic range of the synthesized image data and a luminance value.

With employment of this image synthesizing method, the image having the wide dynamic range can be produced while both the color balance and the white balance are properly adjusted.

Preferably, in the image synthesizing method, the total gain value may be a value corresponding to the dynamic range, so that the saturation correcting operation is carried out. With employment of this image synthesizing method, the saturation correcting operation can be readily carried out in response to the dynamic range.

Preferably, in the image synthesizing method, the saturation correcting operation may be carried out by multiplying the value of the color difference signal by a saturation correcting coefficient. With employment of this image synthesizing method, the calculating process operation as to the saturation correcting operation can be carried out in an easy manner.

Further, in the image synthesizing method, the saturation correcting coefficient may be prepared in a lookup table in which the saturation correcting coefficient becomes smaller than, or equal to a coefficient value "1" on the side of higher luminance than, equal to predetermined luminance. With employment of this image synthesizing method, the calculating process operation as to the saturation correcting operation can be carried out in an easier manner.

According to second aspect of the invention, an imaging apparatus comprises: an imaging element for outputting both a color signal of high-power image data and a color signal of low-power image data; gamma correcting means for gamma-correcting the high-power image data and for gamma-correcting the low-power image data; image synthesizing means for adding the high-power image data which has been gamma-corrected by the gamma correcting means to the low-power image data which has been gamma-corrected by the gamma correcting means, and also for multiplying the added image data by a total gain value in response to a scene so as to perform an image synthesizing operation; converting means for converting the synthesized image data synthesized by the image synthesizing means into both a luminance signal and a color difference signal; and saturation correcting means for performing a saturation correcting process operation with respect to the color difference signal in response to the luminance signal obtained by the converting means and a dynamic range of the synthesized image data.

With employment of this structure, the image having the wide dynamic range can be imaged while both the color balance and the white balance are properly controlled.

DETAILED DESCRIPTION OF THE PREFERRED EMBODIMENTS

Referring now to drawings, an embodiment of the present invention will be described.

Figure 1:
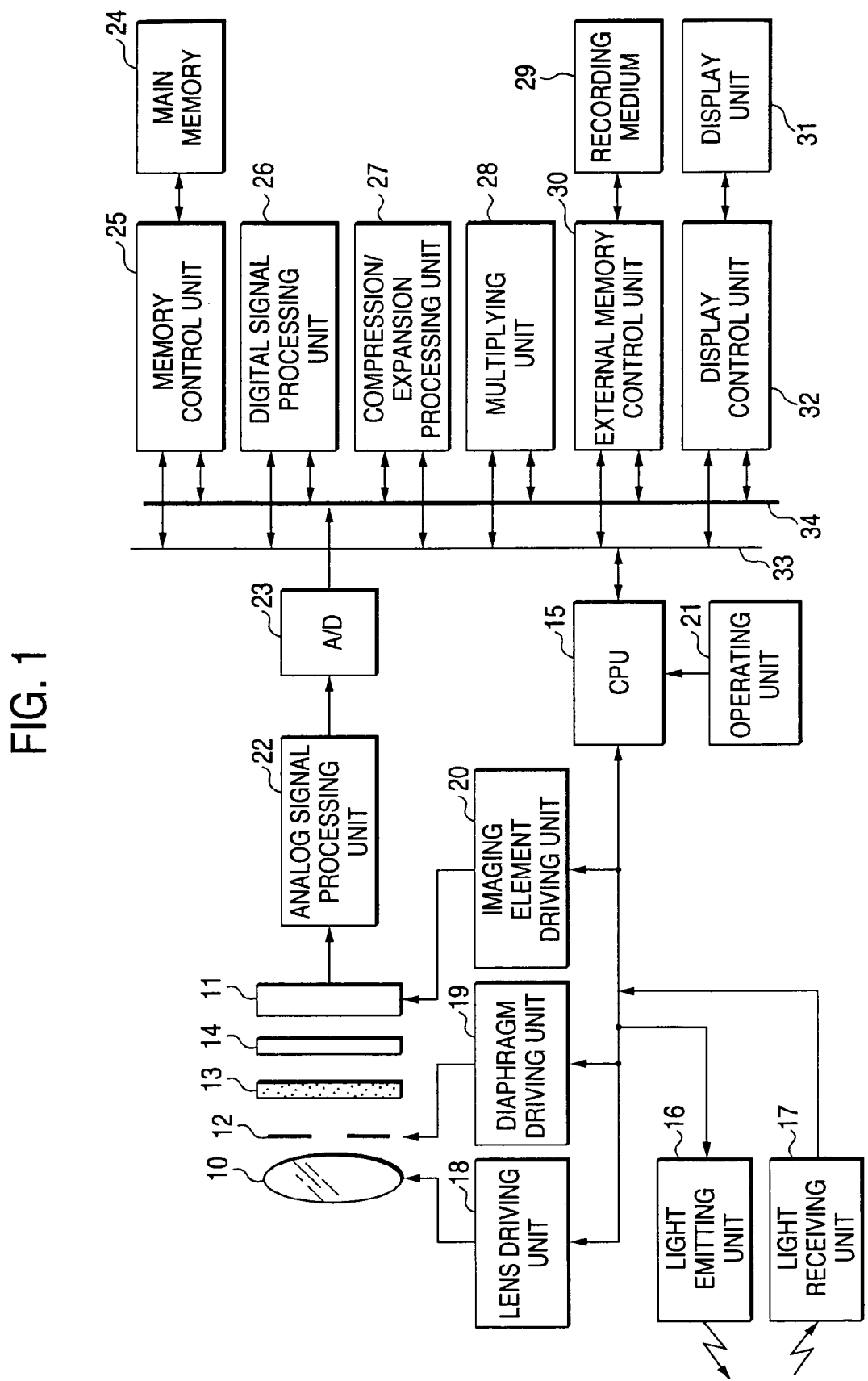
FIG. 1 is a structural diagram of a digital still camera according to an embodiment of the present invention.

FIG. 1 is a structural diagram for showing a digital still camera according to an embodiment of the present invention. Although the digital still camera is explained as an example in this embodiment, the present invention may be applied to other sorts of imaging apparatus such as digital video cameras. Also, an image synthesizing process operation of this embodiment is carried out in a software manner by a digital signal processing unit 26 (will be discussed later), but may be alternatively realized by employing a hardware circuit.

The digital still camera shown in FIG. 1 is equipped with a photographing lens 10, a solid-state imaging element 11, a diaphragm 12 provided between both the imaging lens 10 and the solid-state imaging element 11, an inferred-ray cutting filter 13, and an optical low-pass filter 14. A CPU 15 which controls an entire unit of the digital still camera controls both a light emitting unit 16 and a light receiving unit 17 for an electronic flash unit (not shown). Also, the CPU 15 controls a lens driving unit 18 so as to adjust a position of the photographing lens 10 to a focusing position, and controls an appearture amount of the diaphragm 12 via a diaphragm driving unit 19 in order that an exposure amount becomes a proper exposure amount.

Also, the CPU 15 drives the solid-state imaging element 11 via an imaging element driving unit 20 so as to output an image of a photographic subject as a color signal, which has been imaged through the photographing lens 10. Also, while an instruction signal issued by a user is entered via an operating unit 21 into the CPU 15, the CPU 15 performs various sorts of control operations in response to this instruction signal.

An electric control system of the digital still camera is equipped with an analog signal processing unit 22 connected to an output terminal of the solid-state imaging element 11, and an A/D converting circuit 23. The A/D converting circuit 23 converts an RGB color signal outputted from this analog signal processing unit 22 into a digital signal. These analog signal processing unit 22 and the A/D converting circuit 23 are controlled by the CPU 15.

Furthermore, the electric control system of this digital still camera is equipped with a memory control unit 25, a digital signal processing unit 26, a compression/expansion processing unit 27, a multiplying unit 28, an external memory control unit 30, and a display control unit 32. The memory control unit 25 is connected to a main memory 24. A detailed operation of the digital signal processing unit 26 will be explained later. The compression/expansion processing unit 27 compresses a photographed image to obtain a JPEG image, and/or expands a compressed image. The multiplying unit 28 multiplies photometric data with each other so as to adjust a gain of a white balance. A detachably-mounted recording medium 29 is connected to the external memory control unit 30. A liquid crystal display unit 31 mounted on a rear surface, and the like of the digital still camera is connected to the display control unit 32. These structural units are connected to each other via both a control bus 33 and a data bus 34, and are controlled based upon commands issued from the CPU 15.

It should be understood that the digital signal processing unit 26, the analog signal processing unit 22, the A/D converting circuit 23, and the like shown in FIG. 1 may be mounted on the digital still camera as separate circuits. Alternatively, it is better to manufacture these electronic units on the same semiconductor substrate as the solid-state imaging element 11 by employing an LSI manufacturing technique to be formed as a single solid-state imaging apparatus.

Figure 2:
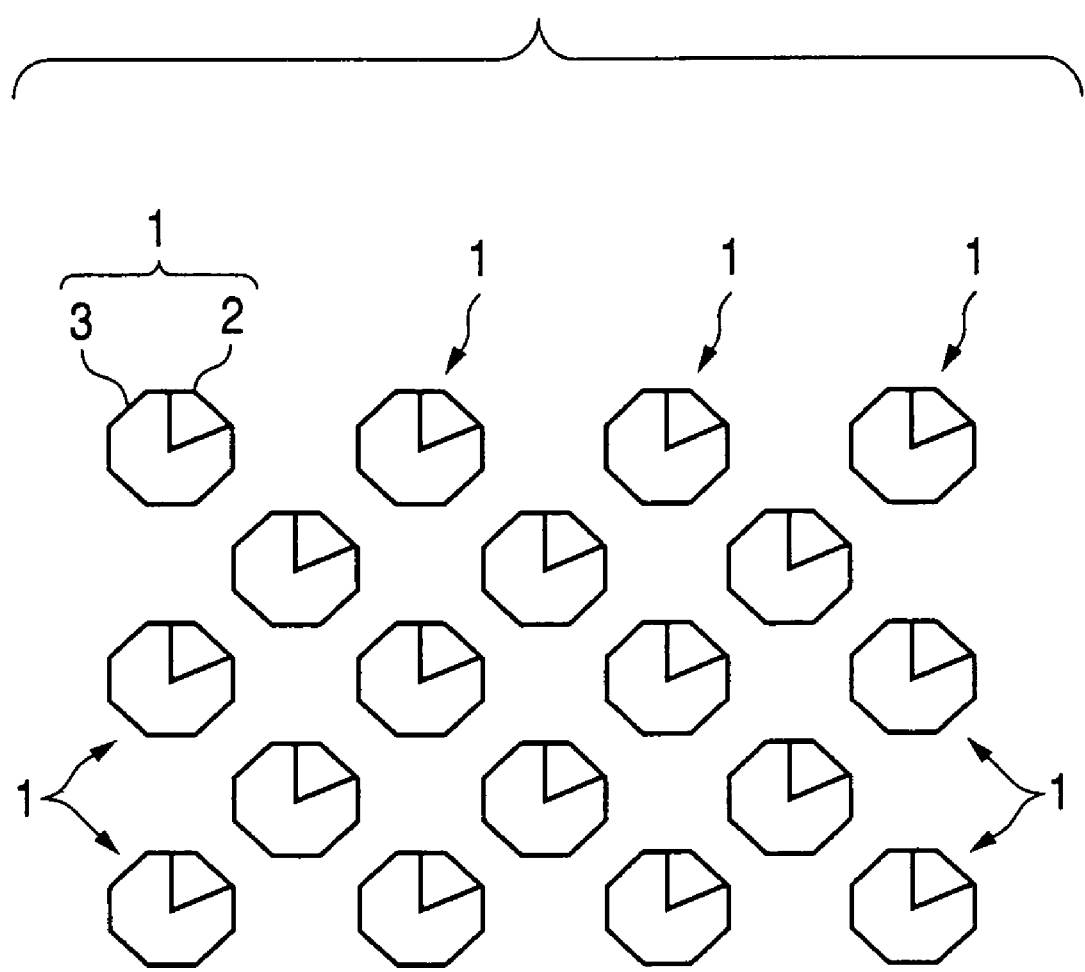
FIG. 2 is a diagram for showing a pixel arranging example of a solid-state imaging element indicated in FIG. 1.

FIG. 2 is an element arranging diagram of the solid-state imaging element 11 used in this embodiment. Pixels 1 of a CCD portion which image an image having a wide dynamic range employ a pixel arrangement described in, for instance, Japanese Laid-open Patent Application No. HEI-10-136391. The respective pixels of odd-numbered column are arranged in such a manner that these pixels are shifted by a ½ pitch along a horizontal direction with respect to the respective pixels of even-numbered columns. Also, vertical transfer paths (not shown) which transfer signal electron charges read out from the respective pixels are arranged in a zigzag line in such a manner that these vertical transfer paths escape from the respective pixels along the vertical direction.

Then, each of the pixels 1 according to this embodiment is provided in the example shown in FIG. 2 in such a manner that each pixel 1 is subdivided into a low-sensitivity pixel 2 and a high-sensitivity pixel 3. The low-sensitivity pixel 2 occupies approximately ⅕ of an entire area of this pixel 1, whereas the high-sensitivity pixel 3 occupies the remaining area thereof, namely approximately ⅘ of the entire area. While signal electron charges of the respective low-sensitivity pixels 2 are discriminated from signal electron charges of the respective high-sensitivity pixels 3, these signal electron charges can be read to the above-explained vertical transfer paths and then can be transferred. It is so determined that the pixel 1 is subdivided based upon which ratio and which position based upon in a design choice. FIG. 2 simply indicates an exemplification of such pixels.

In the imaging apparatus according to this embodiment, both a low-sensitivity image (namely, image acquired by low-sensitivity pixel 2) and a high-sensitivity image (namely, image acquired by high-sensitivity pixel 3) are acquired at the same time within a single imaging operation, and the respective images are sequentially read out from the respective pixels 2 and 3, and then, the sequentially read images are synthesized with each other in the below-mentioned synthesizing manner to output a synthesized image.

It should also be noted that as to the solid-state imaging element 11, the CCD having such a honeycomb pixel arrangement as shown in FIG. 2 has been explained. Alternatively, either a bayer type CCD or a bayer type CMOS sensor may be employed.

Figure 3:
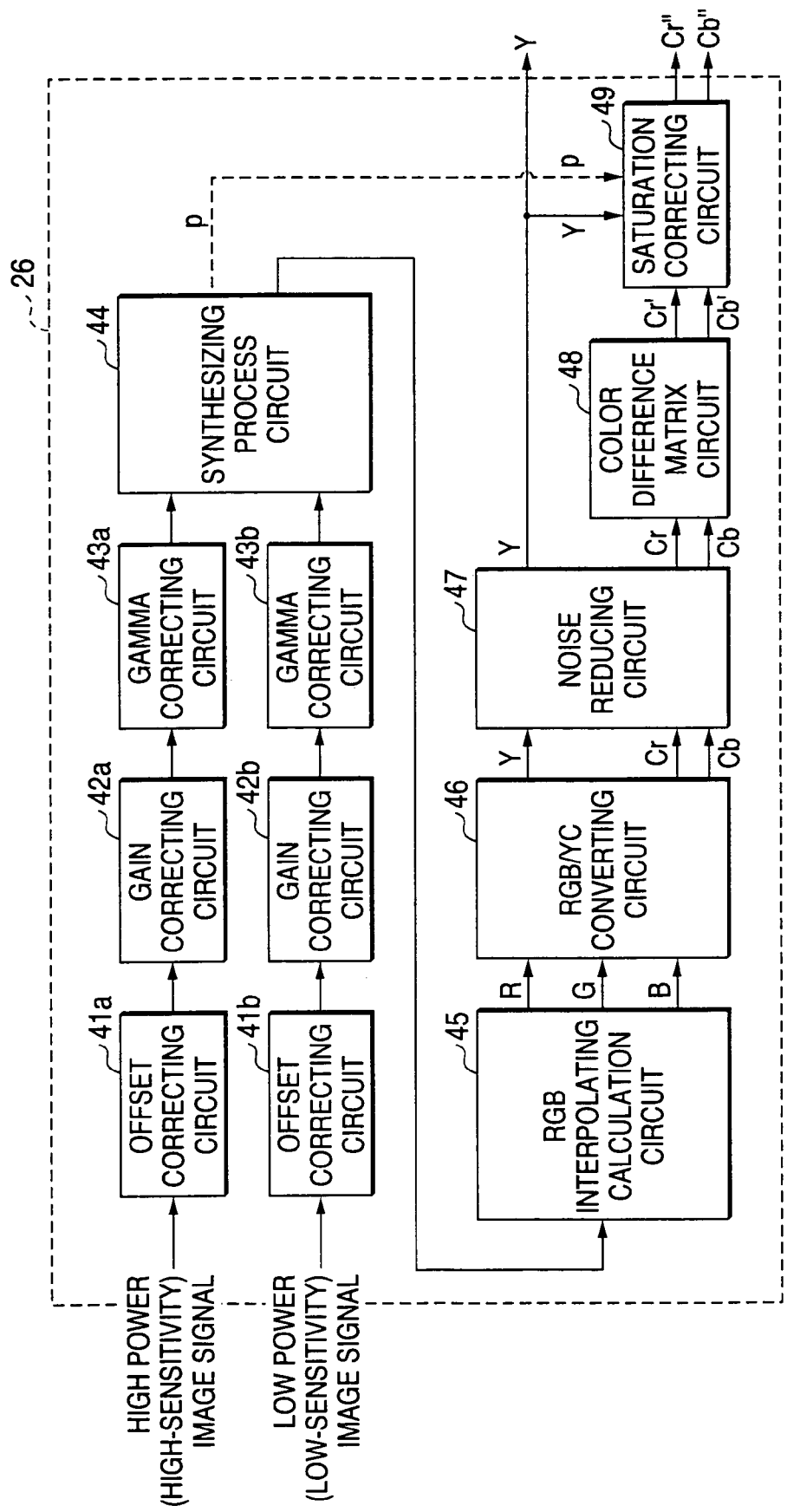
FIG. 3 is a detailed structural diagram of a digital signal processing unit indicated in FIG. 1.

FIG. 3 is a detailed structural diagram of the digital signal processing unit 26 shown in FIG. 1. This digital signal processing unit 26 employs such a logarithmic adding system that after a high-sensitivity image signal and a low-sensitivity image signal are gamma-corrected respectively, the gamma-corrected high-sensitivity image signal is added to the gamma-corrected low-sensitivity image signal. The digital signal processing unit 26 is provided with an offset correcting circuit 41a, a gain correcting circuit 42a, a gamma correcting circuit 43a, another offset correcting circuit 41b, another gain correcting circuit 42b, and another gamma correcting circuit 43b. The offset correcting circuit 41a performs an offset process operation by acquiring RGB color signals made of digital signals of a high-sensitivity image which is outputted from the A/D converting circuit 23 shown in FIG. 1. The gain correcting circuit 42a adjusts a white balance as to the output signals of the offset correcting circuit 41a. The gamma correcting circuit 43a performs a gamma correction with respect to the color signals after being white balance corrected. The offset correcting circuit 41b performs an offset process operation by acquiring RGB color signals made of digital signals of a low-sensitivity image which is outputted from the A/D converting circuit 23 shown in FIG. 1. The gain correcting circuit 42b adjusts a white balance as to the output signals of the offset correcting circuit 41b. The gamma correcting circuit 43b performs a gamma correction with respect to the color signals after being white balance corrected. In such a case that a linear matrix process operation and the like are carried out with respect to the signals after being gamma-corrected, this linear matrix process operation is carried out between the gain correcting circuits 42a/42b and the gamma correcting circuits 43a/43b.

The digital signal processing unit 26 is further provided with an image synthesizing process circuit 44, an RGB interpolating calculation unit 45, an RGB/YC converting circuit 46, a noise filter 47, a color difference matrix circuit 48, and a saturation correcting circuit 49. The image synthesizing process circuit 44 acquires both the RGB color signals outputted from the respective gamma correcting circuits 43a and 43b, and performs an image synthesizing process operation with respect to the acquired output signals in a synthesizing manner (will be discussed later in detail). The RGB interpolating calculation unit 45 interpolates the RGB color signals after being image-synthesized so as to acquire 3 color (RGB) signals at the respective pixel positions. The RGB/YC converting circuit 46 acquires a luminance signal "Y", and color difference signals "Cr" and "Cb" from the RGB color signals. The noise filter 47 reduces noise from the luminance signal "Y", and the color difference signals "Cr" and "Cb." The color difference matrix circuit 48 multiplies a color difference matrix [C–MTX] with respect to the color difference signals "Cr" and "Cb" so as to execute a color tone correction. The saturation correcting circuit 49 performs a saturation correction in response to luminance with reference to the color difference signals outputted from the color difference matrix circuit 48 (will be explained later).

If the solid-state imaging element 11 is a three-plate type imaging element, then the RGB interpolating calculation unit 45 is not required. Since the solid-state imaging element 11 is a single-plate type solid-state imaging element used in the digital still camera of this embodiment, and also, only one color signal among three color (RGB) signals is outputted from each of the pixels, color signals which are not outputted are obtained from color signals of the peripheral pixels by performing an interpolating calculation. Namely, as to a pixel for outputting an R-color signal, how degrees both a G-color signal and a B-color signal are produced at this pixel position from G- and B-color signals of pixels located at peripheral positions of this R-color pixel by way of the interpolating calculation.

The above-described image synthesizing process circuit 44 synthesizes the high-sensitivity image signal outputted from the gamma correcting circuit 43a with the low-sensitivity image signal outputted from the gamma correcting circuit 43b in the unit of a pixel in accordance with the below-mentioned formula 1, and then, outputs a synthesized image signal.

$$\text{data} = [\text{high} + \text{MIN}(\text{high}/th, 1) \times \text{low}] \times \text{MAX}[(-k \times \text{high}/th) + \alpha, p] \quad \text{[Formula 1]}$$

In this expression 1, symbols thereof are defined as follows:

"high": gamma-corrected data as to high-sensitivity (high power) image signal;

"low"=gamma-corrected data as to low-sensitivity (low power) image signal;

"p": total gain;

"k": coefficient;

"th": threshold value;

"α": value (nearly equal to 1) determined by scene.

The threshold value "th" corresponds to such a value. That is, when the gamma-corrected data is 8-bit data (namely, 256 gradation), this threshold value "th" corresponds to, for example, both "219" among the values "0" to "255", and a value which is designated by either a user of a digital still camera or a designer of this digital still camera.

A first term of the expression 1 indicates that when the high-sensitivity image data "high" exceeds the threshold value "th", the low-sensitivity image data "low" is directly added to the high-sensitivity image data "high", whereas when the high-sensitivity image data "high" is smaller than, or equal to the threshold value "th", such a value is added to the high-sensitivity image data "high." This value is obtained by multiplying the low-sensitivity image data "low" with respect to the threshold value "th" of the high-sensitivity image data "high."

This embodiment is featured that the added data calculated in this first term is not directly used as the synthesized image data, but such a value obtained by multiplying this first term by a second term "MAX([−k×high/th)+α,p])" is used as the synthesized image data.

In this second term, as to the coefficient "k", such a value of "0.2" may be employed in the solid-state image element 11 of the embodiment shown in FIG. 2. As shown in the solid-state imaging element 11 of FIG. 2, in the case that a saturation ratio of signal electron charges as to the high-sensitivity pixel 3 and the low-sensitivity pixel 2 is different, the coefficient "k" may be calculated based upon the below-mentioned expression 2 for the sake of convenience.

$$\text{coefficient } ``k\text{''}=1-Sh/(Sh+Sl) \quad \text{[Expression 2]}$$

where:
Sh: signal charge saturation amount of high-sensitivity pixel; and
Sl: signal charge saturation amount of low-sensitivity pixel.

In this example shown in FIG. 2, although an area ratio of a photodiode does not directly constitute the saturation ratio, this saturation ratio may be recognized as the area ratio, for the sake of convenience. Then, when the above-explained example is applied, the coefficient "k" may be obtained as follows:

$$k=1-4/(4+1)=1-0.8=0.2$$

Figure 5:
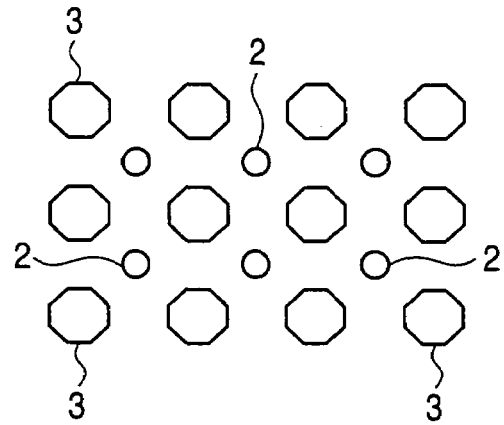
FIG. 5 is a pixel arranging diagram of a solid-state imaging element according to another embodiment of the present invention.

A solid-state imaging element having a high-sensitivity pixel and a low-sensitivity pixel in combination with each other is not limited only to the solid-state imaging element exemplified in FIG. 2, but also may be conceived from another element example shown in, for example, FIG. 5. That is, while aperture areas of micro lenses (not shown) are varied which are provided on a large number of photodiodes (not shown) formed in the same sizes/shapes, high-sensitivity pixels 3 and low-sensitivity pixels 2 are provided.

In this case, since the saturation amount of the signal electron charges of the high-sensitivity pixel becomes equal to that of the signal electron charges of the low-sensitivity pixel, the expression 2 cannot be applied. However, the value of the coefficient "k" is calculated in an experimental manner, or the value of the coefficient "k" is calculated based upon the aperture area of the micro lenses, so that the expression 1 may be applied. A value of this coefficient "k" corresponds to a structure of a solid-state imaging element, and is not arbitrarily changed by a user, but may be set to a fixed coefficient value when an imaging apparatus is shipped.

In the expression 1, as the value of the above-explained total gain "p", a value which has been determined in an experimental manner is employed in this embodiment. The total gain value "p" corresponds to a gain with respect to the entire dynamic range of the synthesized image data. In accordance with this embodiment, this total gain value "p" is controlled so as to control a dynamic range of an image. The smaller the total gain value "p" becomes, the wider the dynamic range becomes. The larger the total gain value "p" becomes, the narrower the dynamic range becomes.

Concretely speaking, the total gain value "p" is varied in response to scenes in such a manner that in a high contrast scene (fine weather in midsummer etc.), the total gain value "p" is equal to 0.8 (p=0.8); in a cloudy day and in the shade, the total gain value "p" is equal to 0.86 (p=0.86); and under fluorescent light within a room, the total gain value "p" is equal to 0.9 (p=0.9). As a result, in such a case that gamma-corrected data corresponds to 8-bit data, 8-bit gradation values may be effectively used.

With respect to the total gain value "p", this total gain value "p" may be set in such a manner that the user designates a sort of scene by using the operating unit 21 shown in FIG. 1, and further, the digital still camera itself automatically judges a scene of a photographing image based upon detected values of various sorts of sensors so as to automatically set this total gain value "p." For instance, a gain amount of a white balance is calculated based upon multiplied value of photometric data obtained by the multiplying unit 28. Since it is possible to automatically judge that what sort of scene is imaged based upon this gain amount of the white balance, a total gain value "p" may be automatically set.

Figure 4:
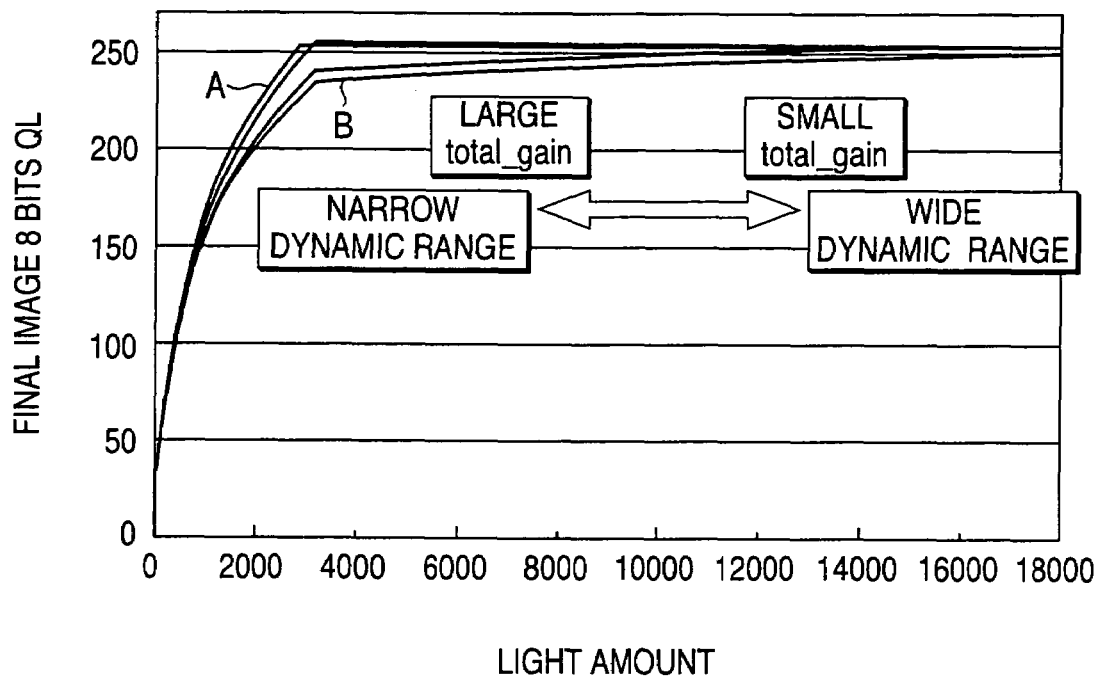
FIG. 4 is a graphic diagram for representing conditions of changes in dynamic ranges.

FIG. 4 is a graphic diagram for representing conditions as to changes in dynamic ranges when the total gain value "p" is varied. In a characteristic curve "A" defined when the total gain value "p" is increased, a dynamic range is narrow. If the total gain value "p" is decreased, then this characteristic curve "A" is changed to another characteristic curve "B" in which a dynamic range is wide.

As previously explained, in accordance with this embodiment, after the high-sensitivity image data has been added to the low-sensitivity image data, the added image data is multiplied by the total gain value calculated in response to the scene, so that such an image having the wide dynamic range under better white balance can be produced. Also, after the bit number of the high-sensitivity image data and the bit number of the low-sensitivity image data are reduced by employing the logarithmic adding method, the image synthesizing operation is carried out. As a result, the circuit scale can be reduced and the digital still camera can be manufactured in low cost.

However, there are some possibilities that a highlight portion of a synthesized image is colored, depending upon a synthesizing degree of the synthesized image and/or a nonlinear characteristic of a gray color (namely, whether or not each signal of RGB color signals is changed in linear manner when strength of white light is varied). In other words, there are certain possibilities that the highlight portion is colored, depending upon the total gain value "p" used by the synthesizing process circuit 44. As a consequence, in this embodiment, since the saturation of the highlight portion is suppressed by the saturation correcting circuit 49, coloring of this highlight portion may not become conspicuous.

Assuming now that a color difference matrix [C-MTX] used in the color difference matrix circuit 48 into which the color difference signals "Cr" and "Cb" are entered is defined as the following expression 3, such color difference signals "Cr'" and "Cb'" which are calculated by the below-mentioned expression 4 are outputted from the color difference matrix circuit 48.

$$[C-MTX] = \begin{bmatrix} a_{11} & a_{12} \\ a_{21} & a_{22} \end{bmatrix} \quad \text{[Expression 3]}$$

$$\begin{bmatrix} Cr' \\ Cb' \end{bmatrix} = [C-MTX] \begin{bmatrix} Cr \\ Cb \end{bmatrix} \quad \text{[Expression 4]}$$
$$= \begin{bmatrix} a'_{11}Cr + a'_{12}Cb \\ a'_{21}Cr + a'_{22}Cb \end{bmatrix}$$

The saturation correcting circuit 49 acquires both the total gain value "p" used by the image synthesizing circuit 44 and the luminance signal "Y" outputted from the noise reducing circuit 47, and performs a calculation process operation defined in the below-mentioned expression 5 with respect to the entered color difference signals "Cr'" and "Cb'", and then outputs color difference signals Cr" and Cb".

$$Cr''=YC\_gain \times Cr'$$

$$Cb''=YC\_gain \times Cb' \quad \text{[Expression 5]}$$

Figure 6:
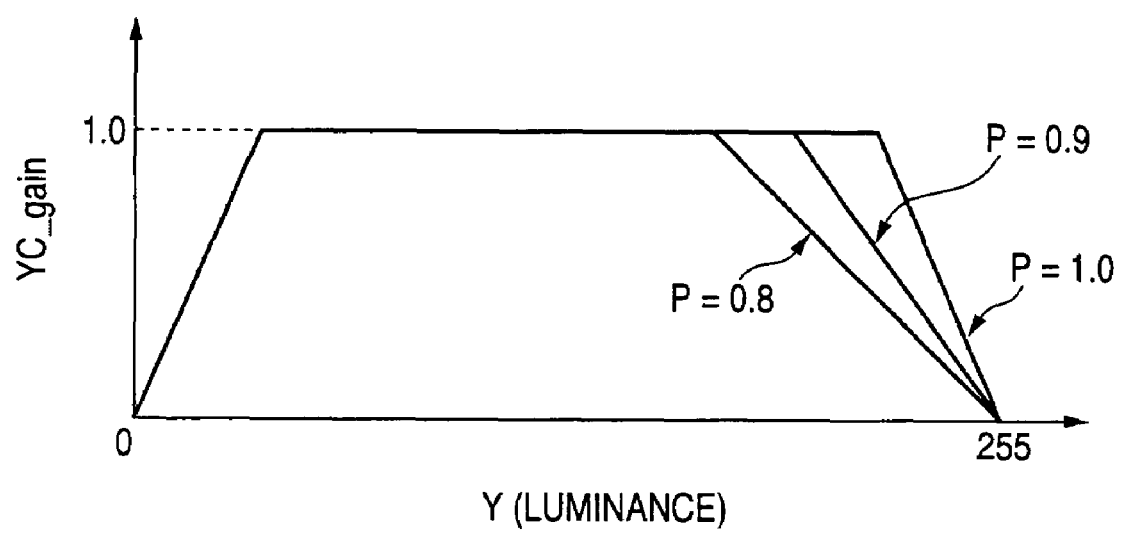
FIG. 6 is a diagram for showing an example of lookup tables prepared in a saturation correcting circuit shown in FIG. 2.

In this case, symbol "YC_gain" is a value which is acquired from a lookup table shown in FIG. 6. In FIG. 6, three lookup tables are represented under such a condition that these lookup tables are overlapped with each other in the case that p=0.8, p=0.9, and p=1.0. An abscissa shows a luminance value "Y", and an ordinate indicates a saturation correcting coefficient value "YC_gain" in FIG. 6. In these lookup tables, the "YC_gain" values are lowered smaller than, or equal to 1 on the side of high saturation. The smaller the total gain value "p" becomes (namely, the wider dynamic range of synthesized image becomes), the saturation correcting coefficient value "YC_gain" is lowered from the low luminance side. As a result, the saturation of the highlight portion of the synthesized image is suppressed, so that the colored highlight portion can hardly become conspicuous.

It should be understood that although the value of "α" may be selected to be a value responding to a scene of a photographed image, such a fixed value "1" may be employed.

In the above-described embodiment, such an example has been described in which both the high power image (high-sensitivity image) and the low power image (low-sensitivity image), which have been photographed in the digital still camera, are synthesized with each other in this digital still camera. Alternatively, the inventive idea of the present invention may be applied to a similar image synthesizing process operation to that of the digital signal processing unit 26. That is, in this similar image synthesizing process operation, while both high-sensitivity image data and low-sensitivity image data, which have been imaged by an imaging apparatus, are stored in a memory and furthermore are derived from the imaging apparatus. These high-sensitivity image data and low-sensitivity image data (CCD-RAW data) are read in a personal computer and the like so as to be image-synthesized with each other. As a result, the synthesized image having the wide dynamic range may be produced, the white balance and the color balance of which have been properly adjusted.

Also, in the above-described embodiment, such an image which has been imaged by a low-sensitivity pixel is referred to as a low-sensitivity image, whereas an image which has been imaged by a high-sensitivity pixel is referred to as a high-sensitivity image. The present invention is not limited only to such a case that images having different sensitivities are synthesized with each other, but may be alternatively applied to another case that a plurality of photographic images are synthesized with each other, which are photographed by the same pixels and aperture amounts of diaphragms are different to each other with respect to these plural images. For example, in such a case that a still life having a high contrast is continuously photographed plural times while exposure amounts are varied, an image which has been photographed based upon a diagram with a wide aperture amount becomes the above-explained high power image, since signal levels outputted from the respective pixels of the solid-state imaging element are high, whereas an image which has been photographed based upon a diaphragm with a narrow aperture amount becomes the above-described low power image, since signal levels outputted from the respective pixels are lower than those of the high power image. The image synthesizing process operation of the above-described embodiment may be applied also to such a case that these image data are synthesized with each other.

In accordance with the present invention, the images having the wide dynamic ranges can be synthesized with each other, whose white balances and color balances have been properly adjusted.

What is claimed is:

1. An image synthesizing method comprising:
   gamma-correcting both a color signal of high-power image data and a color signal of low-power image data respectively;
   synthesizing the gamma-corrected image data with each other, in such a manner that added image data of the high-power image data and the low-power image data is multiplied by a total gain value in response to a scene;
   converting color signals of the synthesized image data into a luminance signal and a color difference signal; and
   subjecting a saturation correcting operation for the synthesized image data in response to a dynamic range of said synthesized image data and the luminance signal.

2. An image synthesizing method as claimed in claim 1, wherein the total gain value is used as a value corresponding to said dynamic range to carry out the saturation correcting operation.

3. An image synthesizing method as claimed in claim 1, wherein said saturation correcting operation is carried out by multiplying a value of said color difference signal by a saturation correcting coefficient.

4. An image synthesizing method as claimed in claim 2, wherein said saturation correcting operation is carried out by multiplying the value of said color difference signal by a saturation correcting coefficient.

5. An image synthesizing method as claimed in claim 3, wherein said saturation correcting coefficient is prepared in a lookup table in which said saturation correcting coefficient becomes smaller than, or equal to a coefficient value "1" on a side of higher luminance than, equal to predetermined luminance.

6. An image synthesizing method as claimed in claim 4, wherein said saturation correcting coefficient is prepared in a lookup table in which said saturation correcting coefficient becomes smaller than, or equal to a coefficient value "1" on a side of higher luminance than, equal to predetermined luminance.

7. An imaging apparatus comprising:
   an imaging element for outputting both a color signal of high-power image data and a color signal of low-power image data;
   gamma correcting means for gamma-correcting the high-power image data and for gamma-correcting the low-power image data;
   image synthesizing means for adding the high-power image data which has been gamma-corrected by the gamma correcting means to the low-power image data which has been gamma-corrected by the gamma correcting means, and also for multiplying the added image data by a total gain value in response to a scene so as to perform an image synthesizing operation;
   converting means for converting the synthesized image data synthesized by the image synthesizing means into both a luminance signal and a color difference signal; and
   saturation correcting means for performing a saturation correcting process operation with respect to the color difference signal in response to the luminance signal obtained by the converting means and a dynamic range of the synthesized image data.

8. An imaging apparatus comprising:

an imaging pickup element which outputs both a color signal of high-power image data and a color signal of low-power image data;

a correction unit which carries out gamma-correction the high-power image data and the low-power image data;

a synthesizer circuit which adds the high-power image data, which has been gamma-corrected, to the low-power image data, which has been gamma-corrected, and multiplies the added image data by a total gain value in response to a scene;

a converter which converts the synthesized image data into both a luminance signal and a color difference signal; and a saturation correcting unit which performs a saturation correcting process operation with respect to the color difference signal in response to the luminance signal and a dynamic range of the synthesized image data.

* * * * *